US007437651B2

(12) United States Patent
Nerl et al.

(10) Patent No.: US 7,437,651 B2
(45) Date of Patent: Oct. 14, 2008

(54) SYSTEM AND METHOD FOR CONTROLLING APPLICATION OF AN ERROR CORRECTION CODE (ECC) ALGORITHM IN A MEMORY SUBSYSTEM

(75) Inventors: John A. Nerl, Londonderry, NH (US); Ken Pomaranski, Roseville, CA (US); Gary Gostin, Plano, TX (US); Andrew Walton, Rocklin, CA (US); David Soper, Murphy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 473 days.

(21) Appl. No.: 10/879,262

(22) Filed: Jun. 29, 2004

(65) Prior Publication Data
US 2005/0289440 A1    Dec. 29, 2005

(51) Int. Cl.
*H03M 13/00* (2006.01)
*G11C 29/00* (2006.01)

(52) U.S. Cl. ...................... 714/767; 714/773
(58) Field of Classification Search ............... 714/767, 714/773
See application file for complete search history.

(56) References Cited

U.S. PATENT DOCUMENTS

| | | | | |
|---|---|---|---|---|
| 5,126,975 A * | 6/1992 | Handy et al. | ............ | 365/230.01 |
| 5,226,009 A * | 7/1993 | Arimoto | ................ | 365/189.04 |
| 5,408,628 A * | 4/1995 | Ameti | ......................... | 714/48 |
| 5,870,573 A * | 2/1999 | Johnson | ...................... | 710/316 |
| 5,912,906 A * | 6/1999 | Wu et al. | ..................... | 714/763 |
| 5,996,103 A * | 11/1999 | Jahanghir | ................... | 714/755 |
| 6,035,436 A * | 3/2000 | Wu et al. | ..................... | 714/797 |
| 6,108,753 A * | 8/2000 | Bossen et al. | ............... | 711/118 |
| 6,161,208 A * | 12/2000 | Dutton et al. | ............... | 714/764 |
| 6,367,047 B1 * | 4/2002 | McAuliffe et al. | .......... | 714/755 |
| 6,374,329 B1 * | 4/2002 | McKinney et al. | .......... | 711/141 |
| 6,467,048 B1 * | 10/2002 | Olarig et al. | ................... | 714/7 |
| 6,567,952 B1 * | 5/2003 | Quach et al. | ................ | 714/800 |
| 6,591,393 B1 * | 7/2003 | Walker et al. | ............... | 714/763 |
| 6,594,785 B1 * | 7/2003 | Gilbertson et al. | ........... | 714/48 |
| 6,654,925 B1 * | 11/2003 | Meaney et al. | .............. | 714/763 |
| 6,711,703 B2 * | 3/2004 | MacLaren et al. | ........... | 714/704 |
| 6,715,116 B2 * | 3/2004 | Lester et al. | ................ | 714/718 |
| 7,149,945 B2 * | 12/2006 | Brueggen | .................... | 714/758 |
| 2003/0070133 A1 * | 4/2003 | Bauman et al. | ............. | 714/763 |

OTHER PUBLICATIONS

S. Kaneda and E. Fujiwara; "Single Byte Error Correcting-Double Byte Error Detecting Codes for Memory Systems," IEEE Transactions on Computers, Vol. C-31, No. 7, Jul. 1982.

* cited by examiner

*Primary Examiner*—Joseph D Torres

(57) ABSTRACT

A method for controlling application of an erasure mode of an error correction code (ECC) algorithm in a memory subsystem includes detecting errors in cache lines retrieved from the memory subsystem using the ECC algorithm. The method also analyzes the errors to detect a repeated bit pattern of data corruption within the cache lines, correlates the detected repeated bit pattern of data corruption to one of a plurality of domains of the memory subsystem, and applies the ECC algorithm to erase bits associated with the detected repeated bit pattern from cache lines retrieved from the correlated domain of the memory subsystem.

9 Claims, 2 Drawing Sheets

SYSTEM AND METHOD FOR CONTROLLING APPLICATION OF AN ERROR CORRECTION CODE (ECC) ALGORITHM IN A MEMORY SUBSYSTEM

CROSS-REFERENCE TO RELATED APPLICATION(S)

The present application is related to U.S. patent application Ser. No. 10/435,150, filed May 9, 2003, entitled "SYSTEMS AND METHODS FOR PROCESSING AN ERROR CORRECTION CODE WORD FOR STORAGE IN MEMORY COMPONENTS," which is incorporated herein by reference; this application is also related to concurrently filed and commonly assigned U.S. patent application Ser. No. 10/879,262, entitled "SYSTEM AND METHOD FOR CONTROLLING APPLICATION OF AN ERROR CORRECTION CODE (ECC) ALGORITHM IN A MEMORY SUBSYSTEM," and U.S. patent application Ser. No. 10/879,643, entitled "SYSTEM AND METHOD FOR APPLYING ERROR CORRECTION CODE (ECC) ERASURE MODE AND CLEARING RECORDED INFORMATION FROM A PAGE DEALLOCATION TABLE," which are incorporated herein by reference.

DESCRIPTION OF RELATED ART

Electronic data storage utilizing commonly available memories (such as dynamic random access memory (DRAM)) can be problematic. Specifically, there is a probability that, when data is stored in memory and subsequently retrieved, the retrieved data will suffer some corruption. For example, DRAM stores information in relatively small capacitors that may suffer a transient corruption due to a variety of mechanisms. Additionally, data corruption may occur as the result of hardware failures such as loose memory modules, blown chips, wiring defects, and/or the like. The errors caused by such failures are referred to as repeatable errors, since the same physical mechanism repeatedly causes the same pattern of data corruption.

A variety of error detection and error correction mechanisms have been developed to mitigate the effects of data corruption. For example, error detection and correction algorithms may be embedded in a number of components in a computer system to address data corruption. Frequently, ECC algorithms are embedded in memory controllers such as coherent memory controllers in distributed shared memory architectures.

In general, error detection algorithms employ redundant data added to a string of data. The redundant data is calculated utilizing a check-sum or cyclic redundancy check (CRC) operation. When the string of data and the original redundant data is retrieved, the redundant data is recalculated utilizing the retrieved data. If the recalculated redundant data does not match the original redundant data, data corruption in the retrieved data is detected.

Error correction code (ECC) algorithms operate in a manner similar to error detection algorithms. When data is stored, redundant data is calculated and stored in association with the data. When the data and the redundant data are subsequently retrieved, the redundant data is recalculated and compared to the retrieved redundant data. When an error is detected (e.g., the original and recalculated redundant data do not match), the original and recalculated redundant data may be used to correct certain categories of errors. An example of a known ECC scheme is described in "Single Byte Error Correcting-Double Byte Error Detecting Codes for Memory subsystems" by Shigeo Kaneda and Eiji Fujiwara, published in IEEE TRANSACTIONS on COMPUTERS, Vol. C31, No. 7, July 1982.

SUMMARY

In one embodiment of the invention, a computer readable medium, comprising executable instructions for controlling application of an error correction code (ECC) algorithm in a memory subsystem, comprises code for recording occurrences of data corruption in data retrieved from the memory subsystem, code for analyzing the occurrences of data corruption to detect a repeated bit pattern of data corruption across different addresses of the memory subsystem, and code for controlling application of the ECC algorithm to erase bits associated with a repeated bit pattern, detected by the code for analyzing, from data retrieved from the memory subsystem.

In another embodiment of the invention, a method for controlling application of an erasure mode of an error correction code (ECC) algorithm in a memory subsystem, comprises detecting errors in cache lines retrieved from the memory subsystem using the ECC algorithm, analyzing the errors to detect a repeated bit pattern of data corruption within the cache lines, correlating the detected repeated bit pattern of data corruption to one of a plurality of domains of the memory subsystem, and applying the ECC algorithm to erase bits associated with the detected repeated bit pattern from cache lines retrieved from the correlated domain of the memory subsystem.

In another embodiment of the invention, a system comprises memory means for storing data, memory controller means for storing caches lines in and retrieving cache lines from the memory means, wherein the memory controller means applies an error correction code (ECC) algorithm to the cache lines to erase predetermined bit locations within the cache lines, means for recording instances of data corruption in cache lines detected by the memory controller means, means for differentiating the instances of data corruption according to transient errors, repeatable errors associated with a memory bank, repeatable errors associated with a memory rank, repeatable errors associated with a bus, repeatable errors associated with all of the memory means, and means for activating an erasure mode for the ECC algorithm for a domain of the memory means in response to the means for differentiating

DETAILED DESCRIPTION

Embodiments of the present invention are directed to employing an ECC algorithm within a memory subsystem to provide increased reliability of the memory subsystem. In one representative embodiment, the ECC algorithm enables multiple "single-byte" errors to be corrected within a single cache line. A single-byte error refers to corruption of any number of bits within eight adjacent bits of a cache line aligned according to eight-bit boundaries. The correctable errors may be transient single-byte errors. Moreover, representative embodiments enable correction of repeatable errors within a single cache line in addition to the correction of transient errors. The repeatable errors may be caused by a failing DRAM part, a memory interconnect malfunction, a memory interface logic malfunction, and/or the like. The correction of a repeatable error occurs according to an "erasure" mode. "Erasing" refers to decoding an ECC code word by assuming that an identified bit or bits are corrupted. The erasure mode is activated by loading a register in a memory controller with a suitable value to identify the location of the repeatable error.

When the erasure mode is activated, performance issues are raised. The additional processing associated with the erasure mode causes memory transactions to consume additional time. Also, the probability of decoding an uncorrectable error as correctable is increased due to the mathematical properties of the ECC algorithm. Even though the increased probability is relatively small, the probability is not insignificant in relatively large memory subsystems.

In one representative embodiment, a software algorithm maintains a record of data corruption detected by the ECC algorithm to enable selective activation of the erasure mode. The software algorithm analyzes the occurrences of data corruption to identify repeated bit patterns. If a repeated bit pattern is identified, the software algorithm correlates the occurrence of data corruption to a particular "domain" (a particular level or a particular component) of the memory subsystem. If a sufficient number of occurrences of data corruption have been detected as originating from the particular domain according to the same pattern of data corruption, the software algorithm activates the erasure mode for the domain of the memory subsystem. The software algorithm may activate the erasure mode by setting appropriate registers of the memory controller of the memory subsystem. The memory subsystem responds by decoding ECC code words from the domain of the memory subsystem by assuming that the identified bits within the ECC code words are corrupted.

Figure 1:
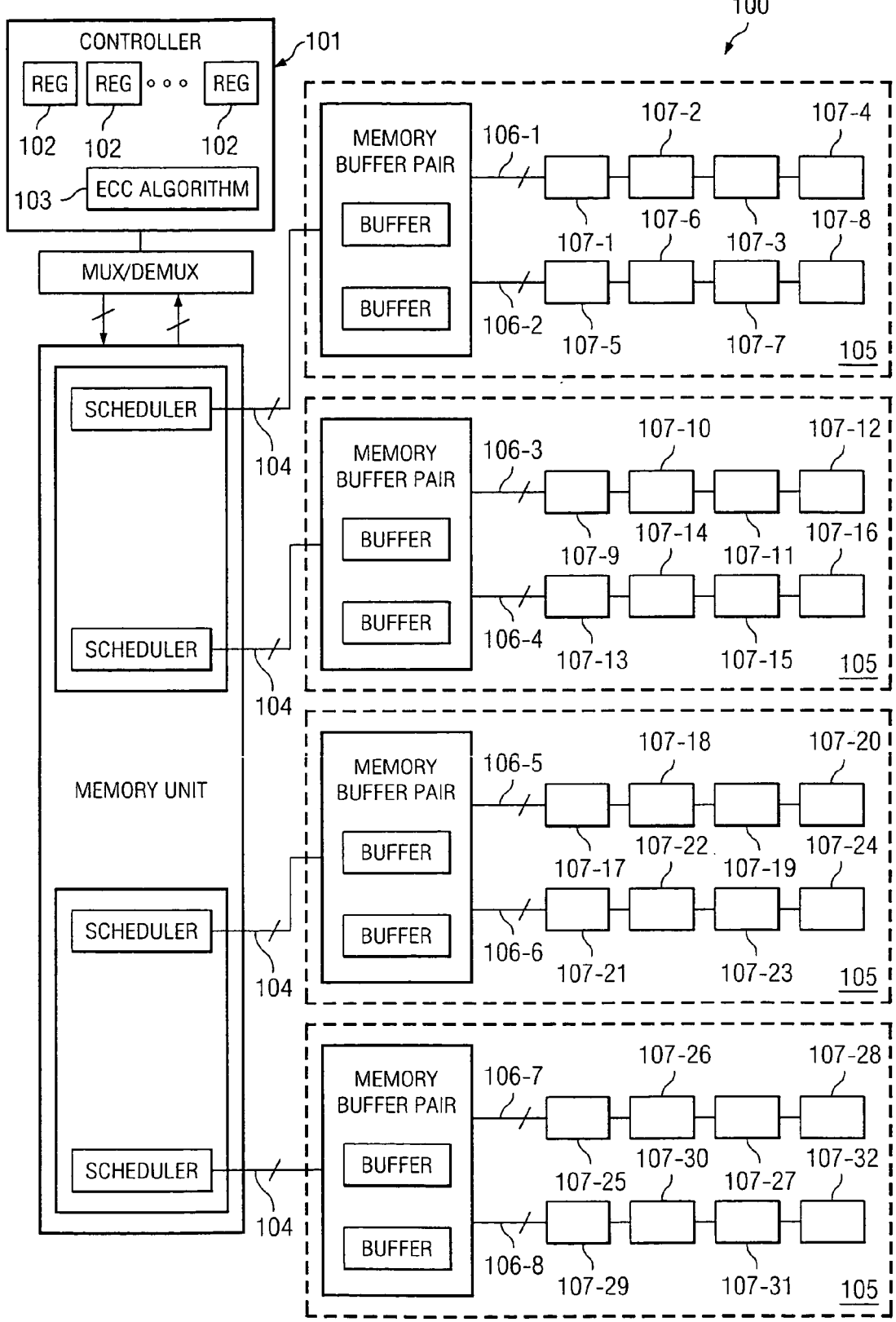
FIG. 1 depicts a memory subsystem that performs data storage using a selectively enabled erasure mode according to one representative embodiment.

Referring now to the drawings, FIG. 1 depicts memory subsystem 100 that performs data storage using a selectively enabled erasure mode according to one representative embodiment. Memory subsystem 100 includes memory controller 101 (e.g., a cache coherency controller). Memory controller 101 manages the storage and retrieval of cache lines to and from the hierarchical arrangement of memory components in memory subsystem 100. Specifically, memory subsystem 100 includes a plurality of memory quadrants 105 that are accessible by respective buses 104. As shown in FIG. 1, each memory quadrant 105 includes two DRAM buses 106 (shown collectively as 106-1 through 106-8) to enable access to eight memory ranks 107 (shown collectively as memory ranks 107-1 through 107-32). Each rank 107 includes a plurality of discrete DRAM banks (not shown) as well known in the art. The plurality of ranks 107 may be implemented by two dual-in-line memory modules (DIMMs). In one representative embodiment, a cache line is stored across a respective rank 107 to facilitate correction of single-byte errors.

Memory controller 101 includes ECC logic 103 to append ECC redundancy bits to cache lines during storage and to utilize the ECC redundancy bits to perform error detection and correction upon retrieval of cache lines. The ECC redundancy bits may be used to address transient errors. Also, the ECC redundancy bits may be used to address repeatable errors. Specifically, malfunctions of various components may cause repeatable errors for selected memory addresses and have no effect on other memory addresses. For example, a wire within DRAM bus 106-1 may exhibit intermittent failure. Cache lines retrieved from ranks 107-1 through 107-4 will exhibit, from time to time, a repeated error for the bit associated with the failing wire. However, cache lines retrieved from ranks 107-5 through 107-32 will not experience a corresponding error at the same bit location. Registers 102 of controller 101 are used by ECC logic 103 to apply the erasure mode of the ECC algorithm to data retrieved from the specific portion of memory subsystem 100 affected by a detected component failure. Hereinafter, the term "domain" shall be used to refer to any portion of the memory subsystem to which the erasure mode ECC processing may be applied independently of the remaining portion of the memory subsystem.

To correct repeatable errors according to an erasure mode in addition to transient errors, ECC logic 103 may utilize a suitable Reed-Solomon burst error correction code to perform single-byte correction. In Reed-Solomon algorithms, the code word consists of n m-bit numbers: $C=(c, c_{n-2}, \ldots, c_o)$. The code word may be represented mathematically by the following polynomial of degree n with the coefficients (symbols) being elements in the finite Galios field ($2^m$): $C(x)=(cx^{n-1}+c_{n-2}x^{n-2} \ldots +c_o)$. The code word is generated utilizing a generator polynomial (typically denoted by g(x)). Specifically, the payload data (denoted by u(x)) is multiplied by the generator polynomial, i.e., $C(x)=x^{n-k}u(x)+[x^{n-k}u(x)mod(g(x))]$ for systematic coding. Systematic coding causes the original payload bits to appear explicitly in defined positions of the code word. The original payload bits are represented by $x^{n-k}u(x)$ and the redundancy information is represented by $[x^{n-k}u(x)mod(g(x))]$.

When the code word is subsequently retrieved from memory, the retrieved code word may suffer data corruption due to a transient failure and/or a repeatable failure. The retrieved code word is represented by the polynomial r(x). If r(x) includes data corruption, r(x) differs from C(x) by an error signal e(x). The redundancy information is recalculated from the retrieved code word. The original redundancy information as stored in memory and the newly calculated redundancy information are combined utilizing an exclusive-or (XOR) operation to form the syndrome polynomial s(x). The syndrome polynomial is also related to the error signal. Using this relationship, several algorithms may determine the error signal and thus correct the errors in the corrupted data represented by r(x). These techniques include error-locator polynomial determination, root finding for determining the positions of error(s), and error value determination for determining the correct bit-pattern of the error(s). For additional details related to recovery of the error signal e(x) from the syndrome s(x) according to Reed-Solomon burst error correction codes, the reader is referred to THE ART OF ERROR CORRECTING CODES by Robert H. Morelos-Zaragoza, pages 33-72 (2002), which is incorporated herein by reference.

Erasures in error correction codes are specific bits or specific strings of bits that are known to be potentially corrupted without resorting to the ECC functionality. For example, specific bits may be identified as being potentially corrupted due to a constant or intermittent hardware failure such as a malfunctioning DRAM component, a wire defect, and/or the like. Introduction of erasures into the ECC algorithm is advantageous, because the positions of the potentially corrupted bits are known. Let d represent the minimum distance of a code, v represent the number of errors, and μ represent the number of erasures contained in a received ECC code word. Then, the minimum Hamming distance between code words is reduced to at least d−μ in the non-erased portions. It follows that the error-correcting capability is [(d−μ−1)/2] and the following relation is maintained: d>2v+μ. Specifically, this inequality demonstrates that for a fixed minimum distance, it is twice as "easy" to correct an erasure as it is to correct a randomly positioned error.

In one representative embodiment, ECC logic 103 of memory controller 101 may implement the decoding procedure of a [36, 33, 4] shortened narrow-sense Reed-Solomon code (where the code word length is 36 symbols, the payload length is 33 symbols, and the Hamming distance is 4 bits) over the finite Galios field ($2^8$). The finite Galios field defines the symbol length to be 8 bits. By adapting ECC logic 103 in this manner, the error correction may occur in two distinct modes. In a first mode, ECC logic 103 performs single-byte correction. In the second mode (the erasure mode), a byte location (or locations) is specified in the ECC code word as an erasure via a register setting. The location is identified by a software or firmware process as a repeatable error caused by a hardware failure. ECC logic 103 decodes the retrieved data by assuming that the single-byte associated with the identified erasure is corrupted. Because the minimum Hamming distance is reduced, ECC logic 103 enables the entire cache line to be recovered even when another (e.g., a transient) single-byte error is present in addition to the erasure error.

Additional details regarding a hardware implementation of the ECC algorithm employing a selectively enabled erasure mode in a memory subsystem may be found in U.S. patent application Ser. No. 10/435,150 entitled "SYSTEMS AND METHODS FOR PROCESSING AN ERROR CORRECTION CODE WORD FOR STORAGE IN MEMORY COMPONENTS."

As previously discussed, data corruption in a memory subsystem may result from a number of causes. Most frequently, the cause of data corruption is a particle strike. A particle strike involves the transfer of energy to a DRAM element thereby changing the state of the DRAM element and corrupting the bit associated with the DRAM element. A particle strike is a random occurrence and, hence, falls within the "transient error" characterization. A particle strike does not indicate that any hardware component is malfunctioning and the appropriate response generally involves correction of the data corruption. DRAM vendors estimate that discrete DRAM elements exhibit an error rate of 5000 to 15000 failures in time (FIT), typically measured in billion device hours. Using 10,000 FIT as an average, a single DIMM can be expected to experience a transient error once every 114 days. In a memory subsystem with 32 DIMMs, approximately 100 errors can be expected per year. Accordingly, the observation of approximately 100 randomly occurring errors per year at random locations in a memory subsystem is not a cause for concern.

Figure 2:
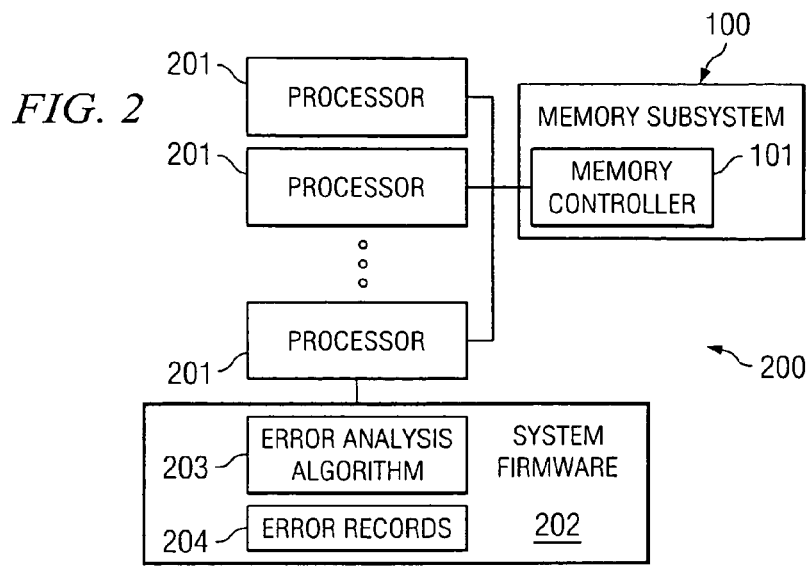
FIG. 2 depicts a computer system employing a software algorithm that records and analyzes memory errors to control the selective activation of erasure mode processing according to one representative embodiment.

Some representative embodiments maintain records of errors to determine whether errors can be characterized as transient errors or repeatable errors to control the selective activation of erasure mode ECC processing. FIG. 2 depicts computer system 200 employing a software algorithm that records and analyzes memory errors to control the selective activation of erasure mode processing according to one representative embodiment. Computer system 200 includes a plurality of processors 201 that store and retrieve cache lines using memory subsystem 100. When an occurrence of data corruption occurs upon the retrieval of a cache line, memory controller 101 detects the error and temporarily stores information related to the error (e.g., the physical memory address and corrupted bits/bytes).

From time to time, error analysis algorithm 203 stored in system firmware 202 (or other suitable non-volatile memory or computer readable medium) is executed by a processor 201. Error analysis algorithm 203 polls memory controller 101 to obtain the information related to detected occurrences of data corruption. In response, error analysis algorithm 203 records the occurrences in error records 204. Error records 204 contain suitable information to enable repeated errors to be detected such as the bit location(s) exhibiting the error(s), the memory addresses of the error(s), the buses, the memory ranks, the DRAM banks used to communicate a corrupted cache line, and/or the like. When a repeated error is detected, error analysis algorithm 203 sets respective registers of memory controller 101 to erase the bits associated with the repeated pattern for the domain of memory subsystem 100 that generated the repeated error.

Figure 3:
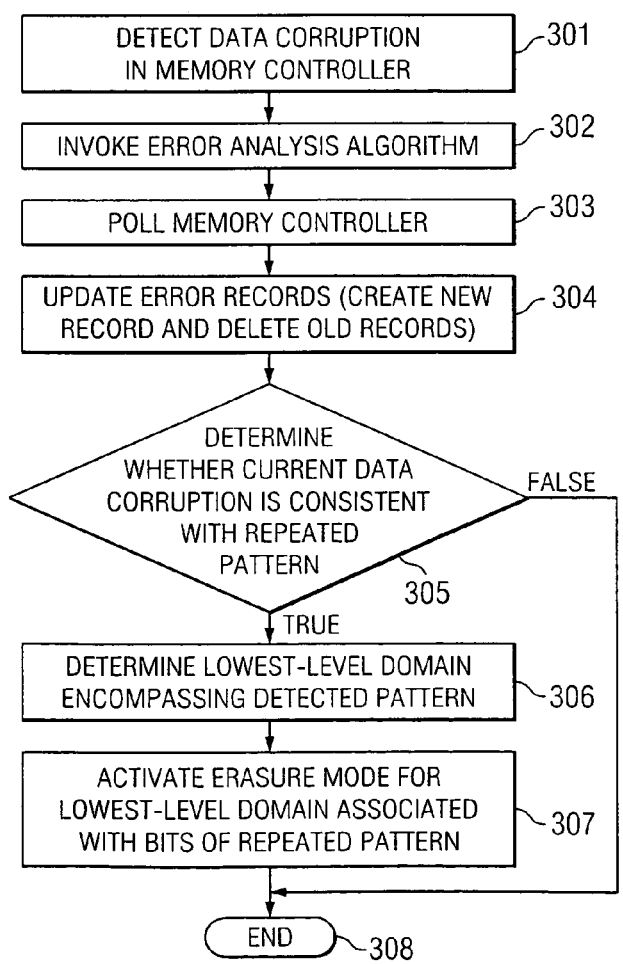
FIG. 3 depicts a flowchart for analyzing data corruption to selectively enable an erasure mode according to one representative embodiment.

FIG. 3 depicts a flowchart for analyzing data corruption to selectively enable an erasure mode according to one representative embodiment. The portions of flowchart of FIG. 3 may be implemented using executable instructions or software code for error analysis algorithm 203. In step 301, data corruption is detected during cache line retrieval from memory subsystem 100 by memory controller 101. In step 302, error analysis algorithm 203 is invoked. In step 303, error analysis algorithm 203 polls memory controller 101 to determine whether any instances of data corruption have occurred. In step 304, error records 204 are updated by error analysis algorithm 203. Specifically, the occurrences of the data corruption are recorded by error analysis algorithm 203. The occurrences of data corruption as detailed in error records 204 are time-stamped or otherwise associated with suitable temporal information. Also, old records of data corruption are erased (e.g., records that are older than twenty-four hours). The purpose of erasing records according to temporal information is that the reliability of memory components is time-dependent. That is, an expected number of transient errors is related to an observation period. Thus, the determination whether observed errors are indicative of transient errors or repeatable errors is facilitated by defining a consistent observation period through appropriate deletion of old records.

In step 305, a logical comparison is made to determine whether the current data corruption is consistent with prior bit patterns of data corruption as reflected in error records 204. If not, the process flow proceeds to step 308 where error analysis 203 ends. If the logical comparison of step 305 is true, the process flow proceeds to step 306.

In step 306, a lowest-level domain associated with the bit pattern associated with the current data corruption is determined. In one representative embodiment, the instances of data corruption for the bit pattern are examined to determine whether the patterns originated from (i) different addresses associated with a respective discrete DRAM bank; (ii) different addresses associated with a respective rank 107 of DRAM components; (iii) different addresses associated with a respective DRAM bus 106; (iv) different addresses associated with a respective quadrant bus 104; or (v) different addresses scattered across memory subsystem 100. From this analysis, the lowest-level domain is determined that encompasses all of the instances of data corruption. In step 307, the erasure mode is activated for the determined domain to erase bits associated with the observed bit pattern of data corruption. In step 308, the process flow ends.

Figure 4:
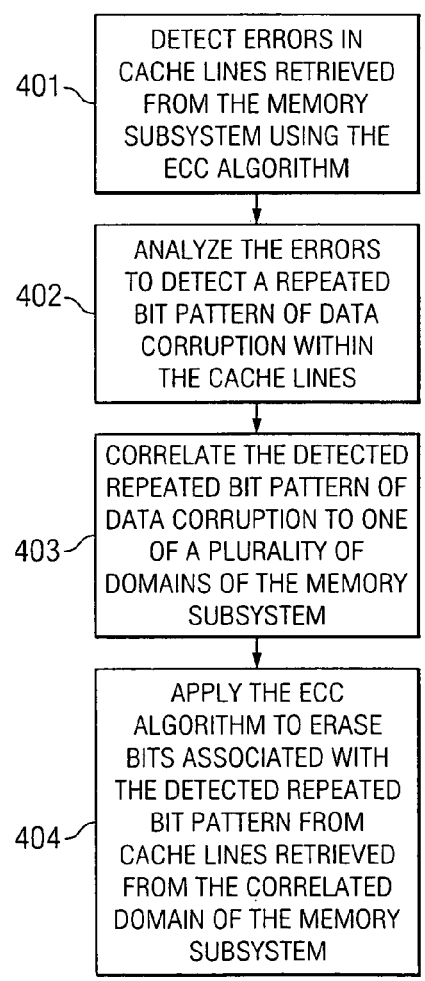
FIG. 4 depicts a flowchart for analyzing data corruption according to one representative embodiment.

FIG. 4 depicts another flowchart for analyzing data corruption associated with a memory subsystem using an ECC algorithm according one representative embodiment. In step 401, errors in cache lines retrieved from the memory subsystem are detected using the ECC algorithm. In step 402, the errors are analyzed to detect a repeated bit pattern of data corruption within the cache lines. In step 403, the detected repeated bit pattern of data corruption is correlated to one of a plurality of domains of the memory subsystem. In step 404, the ECC algorithm is applied to erase bits associated with the detected repeated bit pattern from cache lines retrieved from the correlated domain of the memory subsystem.

It shall be appreciated that the memory subsystem architecture and functionality shown in FIG. 1 is by way of example only. Representative embodiments may enable selective activation of erasure mode ECC processing in any suitable memory subsystem. Even though one embodiment applies single-byte erasure error correction, representative embodiments can employ any suitable ECC scheme that enable ECC code words to be decoded by assuming identified bits are corrupted.

Representative embodiments enable a memory subsystem to be resilient against memory errors. Specifically, the correction of a repeated error and a single transient error within the same cache line appreciably reduces the probability that data corruption will cause an unrecoverable error or a system crash. Representative embodiments enable the correction of such errors by analyzing occurrences of data corruption and correlating those errors to specific components or portions of a memory subsystem. By performing such correlation, an erasure mode of an ECC algorithm may be applied. Furthermore, the erasure mode of the ECC algorithm can be limited to a specific subset of the memory subsystem thereby reducing performance limitations associated with the ECC erasure mode.

What is claimed is:

1. A method for controlling application of an erasure mode of an error correction code (ECC) algorithm in a memory subsystem, comprising:

detecting errors in cache lines retrieved from said memory subsystem using said ECC algorithm;

analyzing said errors to detect a repeated bit pattern of data corruption within said cache lines;

correlating said detected repeated bit pattern of data corruption to one of a plurality of domains of said memory subsystem; and applying said ECC algorithm to erase bits associated with said detected repeated bit pattern from cache lines retrieved from said correlated domain of said memory subsystem.

2. The method of claim 1 wherein said applying said ECC algorithm erases said bits associated with said detected repeated bit pattern from cache lines retrieved from a memory rank.

3. The method of claim 1 wherein said applying said ECC algorithm erases said bits associated with said detected repeated bit pattern from cache lines communicated over a first bus coupled to a plurality of memory ranks.

4. of claim The method 1 wherein said applying said ECC algorithm erases said bits associated with said detected repeated bit pattern from cache lines communicated over a first bus coupled to a second bus and a third bus, wherein said second and third buses are coupled to pluralities of memory ranks.

5. The method of claim 1 wherein said bits to be erased are bits retrieved from a discrete memory bank.

6. The method of claim 1 wherein said ECC algorithm corrects an occurrence of a single-byte transient error in a cache line retrieved from said memory subsystem and, in said erasure mode, corrects an additional single-byte repeatable error corresponding to said erased bits.

7. The method of claim 1 wherein said applying comprises:

loading a register of a memory controller identifying said bits associated with said repeated bit pattern to be erased.

8. The method of claim 1 wherein said analyzing, correlating, and applying are performed by software stored in firmware of a computer system.

9. The method of claim 1 wherein said ECC algorithm enables erasure of single-bytes from retrieved cache lines.

* * * * *

UNITED STATES PATENT AND TRADEMARK OFFICE
CERTIFICATE OF CORRECTION

PATENT NO. : 7,437,651 B2
APPLICATION NO. : 10/879262
DATED : October 14, 2008
INVENTOR(S) : John A. Nerl et al.

It is certified that error appears in the above-identified patent and that said Letters Patent is hereby corrected as shown below:

In column 8, line 16, in Claim 4, delete "of claim The method 1 " and insert -- The method of claim 1 --, therefor.

Signed and Sealed this

Seventh Day of April, 2009

JOHN DOLL
*Acting Director of the United States Patent and Trademark Office*